3,087,975
**PROCESS FOR MAKING HALOGENATED
ORGANIC COMPOUNDS**
Murray Hauptschein, Glenside, and Arnold H. Fainberg, Elkins Park, Pa., assignors to Pennsalt Chemicals Corporation, Philadelphia, Pa., a corporation of Pennsylvania
No Drawing. Filed Apr. 12, 1960, Ser. No. 21,589
12 Claims. (Cl. 260—653)

This invention relates to a catalytic process for the conversion of perfluorochloromethanes to methanes of higher fluorine content by disproportionation reactions.

Perfluorochloromethanes (i.e. methanes containing only the elements chlorine, fluorine and carbon) are widely used as refrigerants, aerosol propellants, and the like. Commercially such compounds are usually prepared by the fluorination of chlorinated methanes such as carbon tetrachloride with anhydrous hydrogen fluoride in the presence of fluorine containing metal salts, such as antimony chlorofluorides.

A disadvantage of this process is that both the hydrogen fluoride and the catalyst employed are highly corrosive and require special handling and equipment precautions. As the fluorination proceeds from the lower to the more highly fluorinated methanes, it is necessary to employ more and more drastic conditions to introduce additional fluorine still further increasing the corrosion problems. Another drawback is the necessity of separating hydrogen fluoride from the products following the fluorination reaction.

It has been previously proposed to disproportionate perfluorochloromethanes to obtain methanes of higher fluorine content by passing them over aluminum chloride or aluminum fluoride catalysts in the vapor phase. An aluminum chloride catalyst however, has the disadvantage that it sublimes during the operation, shortening the catalyst life and causing handling difficulties.

Aluminum fluoride catalysts have the disadvantage of relatively low activity for this reaction even when specially prepared such as by the fluorination of aluminum chloride with anhydrous hydrogen fluoride.

In accordance with the present invention, a simple, efficient, vapor phase catalytic process has been discovered, which substantially eliminates the handling of corrosive materials by which perfluorochloromethanes may be converted through disproportionation reactions into a more highly fluorinated state. Generally speaking, the process of the invention involves contacting in the vapor phase a perfluorochloromethane having at least one fluorine atom and at least one chlorine atom with a specially treated activated alumina catalyst at a temperature of from 150° to 600° C. to produce methanes of higher fluorine content than the starting materials. In this process, high conversions and yields of the disproportionated products are obtained due to the high activity of the catalyst employed.

The catalyst is prepared by treating activated alumina with a lower fluorocarbon (i.e. a relatively low molecular weight fluorine containing carbon compound) containing not more than one hydrogen atom at an elevated temperature and continuing the treatment until the evolution of carbon oxides has substantially ceased. During the course of such treatment, an exothermic reaction occurs accompanied by the evolution of carbon monoxide and/or carbon dioxide together in some cases with variable amounts of other products. When the evolution of carbon oxides has substantially ceased, the catalyst is ready for use.

Activated alumina which is required in the preparation of the catalyst of the invention, is characterized, as is well recognized in the art, by its relatively high surface area as distinguished from non-activated forms such as corundum or alpha alumina which are dense, low-surface materials. Typically, activated aluminas may have surface areas ranging, e.g. from 10 to 300 square meters per gram.

As is well known, activated aluminas are generally prepared by the controlled dehydration or calcination of hydrated aluminas which may be natural or synthetic. Thus, for example, the controlled calcination of alpha alumina trihydrate or beta alumina trihydrate will produce a highly porous structure having high internal surface area. The hydrated alumina starting material may be natural, such as bauxite, or synthetically prepared such as by the precipitation of aluminum nitrate, aluminum sulfate or other soluble aluminum salt to produce a hydrated alumina gel which is then washed and calcined under control temperature conditions to produce the activated form.

It is highly preferred to employ essentially unmodified activated alumina, that is an activated alumina which contains at the most small amounts, e.g. one to two percent, of other materials (other than inert residues such as carbon from binders and the like). Desirably, the alumina should be low in $Na_2O$ and $Fe_2O_3$. Although essentially unmodified activated alumina is preferred, in some case it may prove desirable to employ an activated alumina containing minor amounts, e.g. from one to twenty percent, of other metals or metal oxides, such as chromium oxide, cobalt oxide, molybdenum oxide and the like. The presence of such metals or metal oxides will often modify the selectivity and/or activity of the catalyst in a given reaction.

The lower fluorocarbons used in the treatment of the activated alumina are relatively low molecular weight fluorine containing carbon compounds usually not containing more than about 8 carbon atoms and preferably of the order of from 1 to 4 carbon atoms. The treatment of the activated alumina with the fluorocarbon to produce the catalyst should be conducted in the vapor phase and it is generally impractical therefore to employ higher molecular weight fluorocarbons which are difficult or impracticable to handle in the vapor phase.

As pointed out above, the fluorocarbon employed for the preparation of the catalyst should not contain more than one hydrogen atom. Apparently, the presence of multiple hydrogen atoms in the molecule interferes with the activation reaction. Thus, for example when the fluorine containing compound $CH_3CF_2Cl$ is passed over activated alumina at a temperature of about 300° C., reaction apparently does occur as evidenced by the evolution of $H_2O$ and $CH_2=CClF$. Carbon oxides, however, are not evolved and the alumina so treated, when tested as a catalyst shows little or no activity.

Preferred fluorocarbons for the treatment of the activated alumina to produce the catalyst are those which in addition to carbon and fluorine contain only elements selected from the class consisting of chlorine and hydrogen, particularly fluoroalkanes of this type. Thus, included in this group are perfluorocarbons (i.e. containing only fluorine and carbon), perfluorochlorocarbons (i.e. containing only carbon, fluorine and chlorine); perfluorohydrocarbons (i.e. containing only carbon, fluorine and hydrogen); and perfluorochlorohydrocarbons (i.e. containing only carbon, fluorine, chlorine and hydrogen); provided always that not more than one hydrogen atom is present in the molecule.

Particularly preferred are the lower perfluorochloroalkanes (i.e. alkanes containing only the elements carbon, fluorine and chlorine). Desirably, the perfluorochloroalkanes employed should have one to six and preferably from one to three carbon atoms. Such compounds have been found to impart high activity to the catalysts, are readily available, and relatively cheap, particularly the perfluorochloroalkanes containing one and two carbon atoms.

Specific examples of fluorocarbons suitable for the treatment of the activated alumina are $CF_2ClCFCl_2$;

$CF_3CCl_3$; $CF_2ClCF_2Cl$; $CF_3CFCl_2$; $CFCl_2CFCl_2$;

$CF_2ClCCl_3$; $CF_2Cl_2$; $CF_3Cl$; $CFCl_3$; $CF_2HCl$;

$CF_3CFClCF_2Cl$; $C_3Cl_3F_5$;

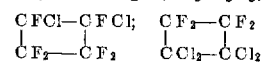

$CF_3H$ and $CF_3CF=CF_2$.

In the preparation of the catalyst, before treatment with the fluorocarbon, it is desirable first to dry the alumina to remove adsorbed moisture. This may be accomplished by heating the activated alumina to a temperature of e.g. 300° to 600° C., preferably 350° to 550° C. for a sufficient time to insure the elimination of any free water, e.g. from 5 minutes to 5 hours. Desirably, during the drying operation, the activated alumina is swept with a stream of an inert gas such as nitrogen.

The treatment of the activated alumina with the fluorocarbon is carried out in the vapor phase at elevated temperatures usually ranging from about 150° C. to 800° C. and preferably from 200° C. to 500° C. In most cases, particularly with the fluorochlorocarbons having from 1 to 3 carbon atoms, the optimum activation temperature, giving catalysts of optimum activity, will range from about 250° C. to 450° C.

An exothermic reaction occurs between the fluorocarbon and the alumina as evidenced by a rise in temperature in the bed. The minimum temperature at which such a reaction may be initiated will vary depending upon the fluorocarbon employed. Reaction may be initiated at temperatures as low as 150° F. with materials such as $CF_2HCl$ whereas with material such as $CF_2Cl_2$ or $CF_2ClCFCl_2$, minimum temperatures of about 200° C. are required to initiate the reaction. In other cases, still higher temperatures may be required to initiate reaction.

The maximum temperature during the activation treatment should not exceed about 800° C. to avoid damage to the catalyst. Indeed, in order to avoid reduction of activity, the catalyst should not be permitted to remain at temperatures above about 500° C. for substantial periods of time during the activation treatment. Thus, while temperatures of the order of 600 to 800° C. for a few minutes resulting e.g. from the exotherm of the reaction may be tolerated, longer periods at these high temperatures may damage the catalyst.

The principal gaseous reaction products during the activation treatment are carbon oxides. These may be in the form of carbon monoxide, carbon dioxide or both and/or in the form of carbon oxide addition products, particularly $COCl_2$ and/or $COClF$. It is understood that the term carbon oxide is intended to include such addition products as well as carbon dioxide and carbon monoxide. Other products such as tetrachloroethylene, carbon tetrachloride, chloroform and chlorofluoroalkanes may also be produced.

Where the treatment of the activated alumina with the fluorocarbon is carried out in a fixed bed, the reaction appears to proceed from the input to the exit of the bed as evidenced by the appearance of a hot zone which travels down the bed in the direction of the gas flow. This hot zone results from the rather strong exothermicity of the activation reaction and care should be taken to avoid the excessive temperatures in the hot zone where apparently most of the reaction is taking place. As pointed out above maximum bed temperatures in excess of about 800° C. should be avoided, and for best results, the catalyst bed temperatures should not be permitted to remain above about 500° C. for substantial periods of time. The maximum temperature reached in the hot zone will depend upon the initial catalyst bed temperature, the temperature and rate of flow of the activating fluorocarbon, the bed dimensions and the like. In order to control maximum bed temperatures during the activation treatment it may be desirable to dilute the fluorocarbon vapors employed for the activation with an inert gas such as nitrogen in order to moderate the exothermicity of the reaction and/or to employ means such as cooling tubes inserted in the catalyst bed in order to remove the heat of reaction during the course of the activation treatment.

Completion of the activation treatment is signaled by a sudden drop, or substantial cessation of the generation of carbon oxides. The generation of carbon oxides may continue subsequently during the use of the catalyst, but the rate of generation is very low relative to the rate of generation during the activation treatment. In fixed bed operations, the completion of the activation may also be observed by the hot zone reaching the exit end of the bed. Depending on the activating agent, the initiation of the activation reaction may occur at a temperature lower than that required to fully activate the catalyst. In such cases it may be necessary or desirable to successively raise the activation temperature (but not above about 800° C.) until the evolution of carbon oxides has substantially ceased.

The time required to complete the activation will depend somewhat upon the temperature employed, the catalyst size, the length and other dimensions of the catalyst bed and the like. Typical activation times under normal conditions may range e.g. from 5 minutes to 5 hours.

During the activation procedure, fluorine derived from the activating fluorocarbon is apparently "fixed" in the activated alumina which shows a weight increase (dry basis) during the activation procedure generally ranging from 1% to 40%, and more usually from about 3% to 20%. During subsequent use, the catalyst may continue to show a very gradual additional increase in weight.

The pressure during the activation treatment is not critical except in the sense that the treatment should be carried out in the vapor phase and accordingly superatmospheric pressures sufficiently high to cause condensation of the reactants or reaction products on the catalyst at the operation temperature employed should be avoided. While atmospheric pressure operation will often be most convenient and economical, subatmospheric and moderate super-atmospheric pressures ranging e.g. from one-tenth of an atmosphere to ten atmospheres may be sometimes desirable.

The high activity of these catalysts for the disproportionation of perfluorochloromethanes is not entirely understood. They have considerably higher activity for such reactions than previously known catalysts containing aluminum and fluorine, such as aluminum fluoride prepared e.g. by the fluorination of $AlCl_3$ or alumina with hydrogen fluoride. Apparently, the aluminum and the fluorine in the catalyst of the invention are associated in a different manner than in these prior catalysts.

Aside from their simplicity of preparation and mode of use, these catalysts also have the advantage of relatively long life. When after prolonged operation the activity of the catalyst begins to decline, it is apparently the result of the gradual deposit of carbon. When this occurs the activity of the catalyst can be readily restored by a relatively simple regeneration procedure involving the passage of oxygen or oxygen containing gases (e.g. air) over the catalyst at temperatures e.g. from 350–500° C. This results in the oxidation of the deposited carbon restoring the catalyst to essentially its original activity. Excessive temperatures should be avoided during the regeneration procedure so as to avoid damaging the catalyst.

The following examples illustrate the preparation of catalysts useful in the process of the invention:

*Example A*

An activated alumina was employed in the form of

⅛" x ⅛" cylindrical pellets containing over 99% ($H_2O$-free basis) of alumina and low in sodium, iron and silica (0.03% $Na_2O$; 0.08% $Fe_2O_3$; 0.22% $SiO_2$). Before drying it has a 26% weight loss on ignition at 1000° C. and a surface area of 231 square meters per gram. While contained in an electrically heated tube, a bed of the above activated alumina was dried by heating at 400° C. while sweeping with nitrogen for about 1.5 hours resulting in the loss of 9.1% by dry weight of water. After drying, the activated alumina, was treated with $CF_3CFCl_2$ at a space velocity of 200 volumes of $CF_3CFCl_2$ vapor (at standard conditions of temperature and pressure) per hour per volume of catalyst for a period of 0.8 hour. The bed was maintained at an average temperature of about 300° C. during the treatment. A hot zone somewhat hotter than the average bed temperature formed at the inlet to the bed at the outset and moved progressively down through the bed toward the exit as the activation treatment proceeded.

During the activation treatment the principal products were a mixture of carbon monoxide and carbon dioxide together with small amounts of $C_2Cl_6$ and $C_2Cl_4$. At the end of about 0.8 hour the evolution of carbon oxides virtually ceased with the appearance of the hot zone at the exit end of the bed. During this treatment the activated alumina increased in weight by about 15.5% over the initial dry weight.

Example B

Activated alumina of the type employed in Example A in the form of ⅛" x ⅛" pellets was charged to a heated tube reactor and heated to a temperature of 500° C. for 1 hour while sweeping with nitrogen to dry it. The bed was then cooled to 290° C. and $CCl_2F_2$ vapors were passed through the bed at a space velocity of 200 volumes of $CCl_2F_2$ per volume of alumina per hour. The principal gaseous products of the activation treatment were $CO_2$ as well as smaller amounts of $COCl_2$. No carbon monoxide was detected. Activation was essentially complete in about 20 minutes, the $CO_2$ production dropping to a low value.

The preparation of other suitable catalysts is described in the copending application of Murray Hauptschein and Arnold H. Fainberg, Serial No. 18,505, filed March 30, 1960, for Catalyst Composition.

Catalysts prepared as described above are highly active for the conversion of perfluorochloromethanes having from 1 to 3 fluorine atoms into more highly fluorinated materials through disproportionation reactions. Such disproportionation reactions may be represented by the following equations:

Equation (1)
$$2CFCl_3 \rightarrow CCl_2F_2 + CCl_4$$

Equation (2)
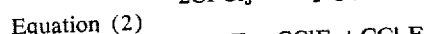
$$2CCl_2F_2 \rightarrow CClF_3 + CCl_3F$$

Equation (3)
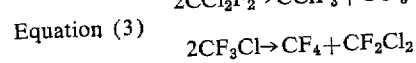
$$2CF_3Cl \rightarrow CF_4 + CF_2Cl_2$$

The above reactions show disproportionation between like molecules. Mixed disproportionation reactions may also occur between two molecules of a different degree of fluorination such as:

Equation (4)
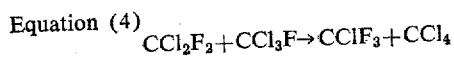
$$CCl_2F_2 + CCl_3F \rightarrow CClF_3 + CCl_4$$

The conversion of difluorodichloromethane to trifluorochloromethane is of particular interest since the fluorination of $CF_2Cl_2$ by conventional methods with hydrogen fluoride and a fluorine containing metal salt requires relatively drastic conditions. From the standpoint of $CF_2Cl_2$ as the reactant and $CF_3Cl$ as the desired product, the following equation can be written:

Equation (5)
$$3CCl_2F_2 \rightarrow 2CClF_3 + CCl_4$$

It is to be understood that the various disproportionation reactions described above may often proceed simultaneously. For example, when $CF_2Cl_2$ is passed over the catalyst in accordance with the invention it will disproportionate to $CF_3Cl$ and $CFCl_3$. The $CFCl_3$ may then further disproportionate to produce $CCl_4$ in accordance with Equation 1 and $CF_2Cl_2$ and $CFCl_3$ may interact as in Equation 4. Accordingly, the ultimate reaction products will often include $CCl_4$ even in cases where the starting materials are higher fluorinated methanes such as $CF_2Cl_2$ and $CF_3Cl$.

The process of the invention is carried out by passing the perfluorochloromethane in the vapor phase and desirably with the exclusion of moisture and oxygen through the catalyst bed at catalyst bed temperatures from 150 to 600° C. and preferably from 200° C. to 450° C. The reactants may be preheated approximately to the desired catalyst bed temperature before passing over the catalyst. In some cases, the reactions involved may be somewhat exothermic and it may be desirable in such cases to preheat the reactants to a temperature somewhat below the desired equilibrium catalyst temperature. Generally, at temperatures below about 150° C., the disproportionation reactions of the invention do not proceed at practical rates. At temperatures above 600° C. on the other hand, the catalyst life is unduly shortened.

The various disproportionation reactions described above occur at different rates depending upon reaction temperature and other process variables. In general, better conversion to disproportionation products higher in fluorine content are obtained at higher temperatures. Thus, considerably higher temperatures are required to disproportionate $CF_3Cl$ to $CF_4$ than in the case of the other disproportionations.

Reaction pressure is not critical except in the sense that the reactants and the reaction products should be maintained in the vapor phase while in contact with the catalyst bed, and accordingly, super-atmospheric pressures sufficiently high to cause condensation of the reactants or reaction products on the catalyst at the operating temperature employed should be avoided. While atmospheric pressure operation will often be most convenient and economical, sub-atmospheric and moderate super-atmospheric pressures ranging e.g. from one-tenth of an atmosphere to twenty atmospheres may be found desirable.

The rate of flow of the reactants over the catalyst is not critical and may vary within wide limits, depending upon the reaction temperature, desired conversion, and other operating conditions. In most cases, practical flow rates will lie within the range of e.g. 50 to 5000 volumes of reactant vapor (calculated at 0° C. and 760 mm. Hg) per volume of catalyst (bulk volume) per hour. At these flow rates, the reaction time (catalyst contact time) will vary from a fraction of a second to about a minute.

The reaction products and unreacted starting materials leaving the catalyst bed may be condensed by cooling and/or compression to form a liquid one-phase mixture from which the desired reaction products may be separated by ordinary fractional distillation, and the unreacted starting material then recycled to the catalyst bed. Perchlorinated materials or low fluorine content materials such as $CCl_4$ and $CFCl_3$ may, if desired, be treated by conventional means, such as HF fluorination in the presence of fluorine containing metal salts, to upgrade them to fluorine containing methanes to be used as starting materials in the process of the invention. The fractional distillation of the product mixtures produced in accordance with the invention is facilitated by the fact that hydrogen fluoride is not used or produced in the process and thus does not appear as a difficult-to-remove contaminant in the reaction products.

Examples 1–8

Activated alumina cylindrical pellets ⅛" x ⅛" in size are charged to a cylindrical 15/16" I.D. electrically heated tube to provide an alumina mass 15/16" in diameter and fifteen inches long. The activated alumina is treated as described in Example A by drying and then subjecting it to $CF_3CFCl_2$ vapors at a temperature of 300° C. until the evolution of CO and $CO_2$ substantially ceases.

$CCl_2F_2$ is metered through a flow meter to the reactor input. The product gases are led to a cooled receiver where the total product is collected. The product analyses are carried out using vapor fractometer and infrared techniques. The temperatures reported are average catalyst bed temperatures measured by thermocouples located in an external longitudinal slot in the heated tube.

The results of eight runs, in which the catalyst temperature varied from 250° to 350° C. and in which the $CF_2Cl_2$ space velocity varied from about 95 to 445 volumes per volume of catalyst per hour, are summarized in the table below:

| Example | Temp. °C | Space velocity vol. of $CF_2Cl_2$/vol. of catalyst/hour | Mole percent conversion of $CF_2Cl_2$ to— | | |
|---|---|---|---|---|---|
| | | | $CF_3Cl$ | $CCl_3F$ | $CCl_4$ |
| 1 | 250 | 95 | 59 | 4 | 27 |
| 2 | 250 | 200 | 55 | 8 | 23 |
| 3 | 300 | 95 | 58 | 7 | 25 |
| 4 | 300 | 200 | 56 | 8 | 24 |
| 5 | 300 | 445 | 48 | 10 | 19 |
| 6 | 350 | 95 | 56 | 8 | 24 |
| 7 | 350 | 200 | 56 | 9 | 23 |
| 8 | 350 | 445 | 51 | 10 | 20 |

Small amounts of $CF_4$ were also produced during the above runs resulting from the disproportionation of $CF_3Cl$.

Where a maximum yield of $CF_3Cl$ is desired through the disproportionation of $CF_2Cl_2$, together with long catalyst life, best results are generally obtained by employing temperatures in the range of from 200° to 450° C.

The disproportionation of $CF_2Cl_2$ in accordance with the invention may be advantageously combined with conventional fluorination processes such as fluorination with hydrogen fluoride in the presence of fluorine containing salts such as antimony chlorofluorides. When it is desired to produce $CF_3Cl$, for example, $CF_2Cl_2$ feed for the catalytic disproportionation reactor is produced in the usual way by feeding tetrachloroethylene, chlorine, and hydrogen fluoride to a fluorination reactor containing an antimony chlorofluoride catalyst to produce $CF_2Cl_2$ in known manner. The $CF_2Cl_2$ produced is then catalytically treated in accordance with the invention to produce a maximum conversion to $CF_3Cl$ together with lower fluorine content disproportionation products $CFCl_3$ and $CCl_4$. The crude disproportionation product is then condensed, neutralized and dried after which the crude, dry product is fractionally distilled to separate $CF_3Cl$ from $CFCl_3$ and $CCl_4$, these latter more highly chlorinated materials being then recycled as feed to the fluorination reactor for conversion to $CF_2Cl_2$ which in turn supplies additional feed to the disproportionation step. Using this procedure the fluorination reactor may be operated under relatively mild conditions to produce the $CF_2Cl_2$ feed for the disproportionation step which then performs the more difficult task of up-grading the $CCl_2F_2$ to $CF_3Cl$.

Examples 9 and 10

Using equipment as described in Examples 1 to 8, a catalyst was prepared as in Example B by drying 1/8" x 1/8" pellets of activated alumina and then treating with $CCl_2F_2$ at a temperature of 290° C. until the evolution of carbon oxides had substantially ceased. Vapors of $CCl_2F_2$ were then passed through the catalyst at a catalyst bed temperature of 300° C. and at a space velocity of 200 and 440 volumes of $CCl_2F_2$ per volume of catalyst per hour. The results obtained are summarized in the table below:

| Example | Temp. °C | Space velocity vol. of $CF_2Cl_2$/vol. of catalyst/hour | Mole percent conversion of $CF_2Cl_2$ to— | | |
|---|---|---|---|---|---|
| | | | $CF_3Cl$ | $CCl_3F$ | $CCl_4$ |
| 9 | 300 | 200 | 57 | 7 | 25 |
| 10 | 300 | 440 | 56 | 8 | 24 |

Example 11

Employing a catalyst prepared as described in Example A, $CFCl_3$ vapors are passed over the catalyst at a catalyst bed temperature of 300° C. and a space velocity of 400 volumes of $CFCl_3$ per volume of catalyst per hour. Disproportionation products are obtained including major amounts of $CCl_2F_2$ and $CCl_4$ and minor amounts of $CF_3Cl$.

It is to be understood that many other variations and embodiments are included within the scope of the invention in addition to those specifically described above; the embodiments described are for the purpose of illustrating and exemplifying the invention and the invention is not limited thereto.

We claim:

1. A method for converting a perfluorochloromethane starting material containing from 1 to 3 fluorine atoms into methanes of higher fluorine content which comprises the step of contacting said starting material at a temperature between 150° and 600° C. with a catalyst prepared by reacting activated alumina with a lower fluorocarbon having not more than one hydrogen atom, said reaction being carried out by contacting vapors of said fluorocarbon with activated alumina at a temperature of the order of 150° C. to 800° C. sufficiently high to initiate an exothermic reaction between said fluorocarbon and said alumina in the course of which reaction said fluorocarbon is converted to carbon oxide and said alumina increases in weight due to the association of fluorine derived from said fluorocarbon therewith, said contacting and the reaction between said fluorocarbon and said alumina being continued until the evolution of carbon oxide substantially ceases, whereupon the thus treated alumina is an active catalyst for the conversion of perfluorochloromethanes into methanes of higher fluorine content.

2. A method in accordance with claim 1 in which the disproportionation of said perfluorochloromethane is carried out at temperatures between 200° and 450° C.

3. A method for converting a perfluorochloromethane starting material having from 1 to 3 fluorine atoms into methanes of higher fluorine content which comprises the step of contacting said starting material at a temperature between 150° and 600° C. with a catalyst prepared by reacting essentially unmodified activated alumina with a lower fluorocarbon containing only elements selected from the class consisting of carbon, fluorine, chlorine and hydrogen and having not more than one hydrogen atom, said reaction being carried out by contacting vapors of said fluorocarbon with said activated alumina at a temperature of the order of 150° C. to 800° C. sufficiently high to initiate an exothermic reaction between said fluorocarbon and said alumina in the course of which reaction said fluorocarbon is converted to carbon oxide and said alumina increases in weight due to the association of fluoride derived from said fluorocarbon therewith, said contacting and the reaction between said fluorocarbon and said alumina being continued until the evolution of carbon oxide substantially ceases, whereupon the thus treated alumina is an active catalyst for the conversion of perfluorochloromethanes into methanes of higher fluorine content.

4. A method in accordance with claim 3 in which the disproportionation of said perfluorochloromethane is carried out at temperatures between 200° C. and 450° C.

5. A method for converting a perfluorochloromethane starting material having from 1 to 3 fluorine atoms into methanes of higher fluorine content which comprises the step of contacting said starting material at a temperature between 150° and 600° C. with a catalyst prepared by reacting essentially unmodified activated alumina with a lower perfluorochloroalkane, said reaction being carried out by contacting vapors of said perfluorochloroalkane with activated alumina at a temperature of the order of 200° C. to 800° C. sufficiently high to initiate an exothermic reaction between said perfluorochloroalkane and said alumina in the course of which reaction said perfluorochloroalkane is converted to carbon oxide and said alumina increases in weight due to the association of fluorine derived from said perfluorochloroalkane therewith, said contacting and the reaction between said perfluorochloroalkane and said alumina being continued until the evolution of carbon oxide substantially ceases, whereupon the thus treated alumina is an active catalyst for the conversion of perfluorochloromethanes into methanes of higher fluorine content.

6. A method in accordance with claim 5 in which the disproportionation of said perfluorochloromethane is carried out at temperatures of from 200° C. to 450° C.

7. A method for converting a perfluorochloromethane selected from the class consisting of CFCl$_3$ and CF$_2$Cl$_2$ into methanes of higher fluorine content which comprises the step of contacting said perfluorochloromethane at a temperature between 150° C. and 600° C. with a catalyst prepared by reacting activated alumina with a lower fluorocarbon having not more than one hydrogen atom, said reaction being carried out by contacting vapors of said fluorocarbon with activated alumina at a temperature of the order of 150° C. to 800° C. sufficiently high to initiate an exothermic reaction between said fluorocarbon and said alumina in the course of which reaction said fluorocarbon is converted to carbon oxide and said alumina increases in weight due to the association of fluorine derived from said fluorocarbon therewith, said contacting and the reaction between said fluorocarbon and said alumina being continued until the evolution of carbon oxide substantially ceases, whereupon the thus treated alumina is an active catalyst for the conversion of perfluorochloromethanes into methanes of higher fluorine content.

8. A method for converting a perfluorochloromethane starting material selected from the class consisting of CFCl$_3$ and CF$_2$Cl$_2$ into methanes of higher fluorine content which comprises the step of contacting said perfluorochloromethane starting material at a temperature between 200° C. and 450° C. with a catalyst prepared by unmodified reacting essentially unmodified activated alumina with a lower fluorocarbon containing only elements selected from the class consisting of carbon, fluorine, chlorine and hydrogen and having not more than one hydrogen atom, said reaction being carried out by contacting vapors of said fluorocarbon with said activated alumina at a temperature of the order of 150° C. to 800° C. sufficiently high to initiate an exothermic reaction between said fluorocarbon and said alumina in the course of which reaction said fluorocarbon is converted to carbon oxide and said alumina increases in weight due to the association of fluorine derived from said fluorocarbon therewith, said contacting and the reaction between said fluorocarbon and said alumina being continued until the evolution of carbon oxide substantially ceases, whereupon the thus treated alumina is an active catalyst for the conversion of perfluorochloromethanes into methanes of higher fluorine content.

9. A method for converting a perfluorochloromethane starting material selected from the class consisting of CFCl$_3$ and CF$_2$Cl$_2$ into methanes of higher fluorine content which comprises the step of contacting said perfluorochloromethane starting material at a temperature between 200° C. and 450° C. with a catalyst prepared by unmodified reacting essentially unmodified activated alumina with a lower perfluorochloroalkane, said reaction being carried out by contacting vapors of said perfluorochloroalkane with activated alumina at a temperature of the order of 200° C. to 800° C. sufficiently high to initiate an exothermic reaction between said perfluorochloroalkane and said alumina in the course of which reaction said perfluorochloroalkane is converted to carbon oxide and said alumina increases in weight due to the association of fluorine derived from said perfluorochloroalkane therewith, said contacting and the reaction between said perfluorochloroalkane and said alumina being continued until the evolution of carbon oxide substantially ceases, whereupon the thus treated alumina is an active catalyst for the conversion of perfluorochloromethanes into methanes of higher fluorine content.

10. A method for converting CF$_2$Cl$_2$ to CF$_3$Cl which comprises the step of contacting said CF$_2$Cl$_2$ at a temperature between 150° and 600° C. with a catalyst prepared by reacting essentially unmodified activated alumina with a lower fluorocarbon containing only elements selected from the class consisting of carbon, fluorine, chlorine and hydrogen and having not more than one hydrogen atom, said reaction being carried out by contacting vapors of said fluorocarbon with said activated alumina at a temperature of the order of 150° C. to 800° C. sufficiently high to initiate an exothermic reaction between said fluorocarbon and said alumina in the course of which reaction said fluorocarbon is converted to carbon oxide and said alumina increases in weight due to the association of fluorine derived from said fluorocarbon therewith, said contacting and the reaction between said fluorocarbon and said alumina being continued until the evolution of carbon oxide substantially ceases, whereupon the thus treated alumina is an active catalyst for the conversion of perfluorochloromethanes into methanes of higher fluorine content.

11. A method in accordance with claim 10 in which the disproportionation of said CF$_2$Cl$_2$ is carried out at temperatures of from 200° C. to 450° C.

12. A method for converting CF$_2$Cl$_2$ to CF$_3$Cl which comprises the step of contacting said CF$_2$Cl$_2$ at a temperature between reacting essentially unmodified activated alumina with a lower perfluorochloroalkane, said reaction being carried out by contacting vapors of said perfluorochloroalkane with activated alumina at a temperature of the order of 200° C. to 800° C. sufficiently high to initiate an exothermic reaction between said perfluorochloroalkane and said alumina in the course of which reaction said perfluorochloroalkane is converted to carbon oxide and said alumina increases in weight due to the association of fluorine derived from said perfluorochloroalkane therewith, said contacting and the reaction between said perfluorochloroalkane and said alumina being continued until the evolution of carbon oxide substantially ceases, whereupon the thus treated alumina is an active catalyst for the conversion of perfluorochloromethanes into methanes of higher fluorine content.

References Cited in the file of this patent

UNITED STATES PATENTS

| | | |
|---|---|---|
| 1,994,035 | Croco | Mar. 12, 1935 |
| 2,637,748 | Miller | May 5, 1953 |
| 2,676,996 | Miller et al. | Apr. 27, 1954 |
| 2,694,739 | Pailthorp | Nov. 16, 1954 |
| 2,946,828 | Scherer et al. | July 26, 1960 |

UNITED STATES PATENT OFFICE
CERTIFICATE OF CORRECTION

Patent No. 3,087,975 April 30, 1963

Murray Hauptschein et al.

It is hereby certified that error appears in the above numbered patent requiring correction and that the said Letters Patent should read as corrected below.

Column 3, line 55, for "COCL$_2$" read -- COCl$_2$ --; column 4, line 43, for "operation" read -- operating --; column 8, line 68, for "fluoride" read -- fluorine --; column 9, line 54, and column 10, line 6, strike out "unmodified", first occurrence, each occurrence; same column 10, line 48, after "between" insert -- 200° C. and 450° C. with a catalyst prepared by --.

Signed and sealed this 3rd day of December 1963.

(SEAL)
Attest:

ERNEST W. SWIDER
Attesting Officer

EDWIN L. REYNOLDS
Acting Commissioner of Patents